United States Patent
Thwaites et al.

(10) Patent No.: US 10,559,406 B2
(45) Date of Patent: Feb. 11, 2020

(54) DATA COMMUNICATION CABLE HAVING MODIFIED DELAY SKEW

(71) Applicant: GENERAL CABLE TECHNOLOGIES CORPORATION, Highland Heights, KY (US)

(72) Inventors: Stephen A. Thwaites, Walton, KY (US); Scott M. Brown, Independence, KY (US); Anthony Carson New, Florence, KY (US); James D. Malkemus, Union, KY (US); Roy B. Kusuma, Cincinnati, OH (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 16/256,362

(22) Filed: Jan. 24, 2019

(65) Prior Publication Data

US 2019/0228882 A1    Jul. 25, 2019

Related U.S. Application Data

(60) Provisional application No. 62/621,234, filed on Jan. 24, 2018.

(51) Int. Cl.
   *H01B 11/00* (2006.01)
   *H01B 7/00* (2006.01)
   *H01B 11/10* (2006.01)
   *H01B 11/12* (2006.01)

(52) U.S. Cl.
   CPC ......... *H01B 11/002* (2013.01); *H01B 7/0009* (2013.01); *H01B 11/10* (2013.01); *H01B 11/12* (2013.01)

(58) Field of Classification Search
   CPC .... H01B 11/002; H01B 11/12; H01B 7/0009; H01B 11/10
   USPC .......................................... 174/27
   See application file for complete search history.

(56) References Cited

U.S. PATENT DOCUMENTS

| | | | | |
|---|---|---|---|---|
| 5,936,205 A | * | 8/1999 | Newmoyer | H01B 7/295 174/113 R |
| 10,249,410 B1 | * | 4/2019 | Lanoe | H01B 9/003 |
| 2005/0006132 A1 | * | 1/2005 | Clark | H01B 7/184 174/113 C |
| 2005/0056454 A1 | * | 3/2005 | Clark | H01B 11/02 174/113 R |
| 2012/0024569 A1 | * | 2/2012 | Jiang | H01B 3/445 174/115 |

* cited by examiner

*Primary Examiner* — Sherman Ng
(74) *Attorney, Agent, or Firm* — Ulmer & Berne LLP

(57) ABSTRACT

Twisted pair data communication cables with modified delay skew values to improve electrical performance are disclosed. Methods of making and using the cables are also disclosed.

19 Claims, No Drawings

DATA COMMUNICATION CABLE HAVING MODIFIED DELAY SKEW

REFERENCE TO RELATED APPLICATIONS

The present application claims the priority of U.S. provisional patent application Ser. No. 62/621,234, entitled DATA COMMUNICATION CABLE HAVING MODIFIED DELAY SKEW, filed Jan. 24, 2018, and hereby incorporates the same application herein by reference in its entirety.

TECHNICAL FIELD

The present disclosure generally relates to data communication cables having desirable and improved electrical characteristics.

BACKGROUND

Twisted pair data communication cables, such as Category 5e, Category 6, Category 6A, and Category 7 cables standardized by ISO/IEC 11801, provide high throughput data communication over relatively long-distances through the use of a plurality of twisted wire pairs. In such data communication cables, the twisted wire pairs use differential signaling to attenuate electromagnetic interference and to reduce crosstalk between adjacent twisted wire pairs. However, further improvements to such data communication cables to, for example, improve the data transmission rate or to improve the effective cable operating length, have traditionally required foaming of cable components or the inclusion of cable shielding. Both such modifications exhibit a number of undesirable attributes including high cost, increased manufacturing difficulty, and reduced cable flexibility and durability.

SUMMARY

In accordance with one embodiment, a communicable cable includes a cable core and a jacket layer surrounding the cable core. The cable core includes a first twisted wire pair having a first lay length and a second twisted wire pair having a second lay length, the second lay length being shorter than the first lay length. The first twisted wire pair includes two insulated wires each including an insulation layer formed of a fluoropolymer and a propagation speed modifier. The communication cable exhibits a delay skew of about 45 nanoseconds or less over a cable length of 100 meters.

In accordance with another embodiment, a communication cable includes a cable core and a jacket layer surrounding the cable core. The cable core includes a first twisted wire pair having a first lay length and a second twisted wire pair having a second lay length. The first twisted wire pair includes two insulated wires each including an insulation layer formed of a fluoropolymer and a propagation speed modifier. The second twisted wire pair includes two insulated wires each including a foamed insulation layer. The first lay length is the longest lay length in the communication cable and the second lay length is the shortest lay length in the communication cable. The communication cable exhibits a delay skew of about 45 nanoseconds or less over a cable length of 100 meters.

DETAILED DESCRIPTION

Twisted pair data communication cables are standardized in accordance to various standards such as ISO/IEC 11801 and TIA-568-B which define, among other qualifications, the required electrical performance of the cables. For example, International Standards Organization ("ISO") 11801 and Telecommunications Industry Association ("TIA") TIA-568-B require that twisted pair data communication cables have a delay skew of less than 45 nanoseconds over a cable length of 100 meters. As used herein, "delay skew" indicates the time difference between the propagation delay of the fastest twisted wire pair and the slowest twisted wire pair, wherein the propagation delay is the time required for a signal to propagate from a first end of the twisted wire pair and be received by a second end of the twisted wire pair.

The propagation delay of a twisted wire pair is influenced by a variety of factors including the conductive material of each wire, the insulation material surrounding each wire, and the twist rate (measured by lay length) of each twisted wire pair. Specifically, these factors determine the effective propagation speed of a signal transmitting through the twisted wire pair. As can be appreciated, a twisted wire pair having a shorter lay length, or tighter twist, (the lay length indicates the degree of twisting and can be determined by measuring the distance between any two consecutive sections of the twisted wire pair which exhibit an identical geometry) will have a longer propagation delay than a twisted wire pair having a longer lay length, or looser twist, because the signal has to transmit over a longer effective wire path due to tighter twisting.

The present disclosure generally relates to twisted pair data communication cables having improved electrical characteristics whereas the delay skew is effectively modified. In particular, the present disclosure describes methods of modifying the propagation speed of particular twisted wire pairs to achieve a desirable delay skew for the overall twisted pair data communication cable (e.g., about 45 nanoseconds or less over a cable length of 100 meters). Further described herein are twisted pair data communication cables that exhibit desirable delay skews while also including twisted wire pairs which have greater differences in lay lengths between the twisted wire pairs. Such cables can take advantage of the modified delay skew to improve the difference in lay lengths.

As can be appreciated, modifying the propagation speed of certain twisted wire pairs can allow a twisted pair data communication cable to include twisted wire pairs that exhibit a relatively greater difference in lay lengths than a comparative cable that does not have twisted wire pairs with modified propagation speeds. For example, a twisted wire pair modified to have a slower propagation speed can have a longer lay length (and consequently have a shorter wire path) while maintaining the same propagation delay as a comparative twisted wire pair that has not had its propagation speed decreased. Conversely, twisted wire pairs having a higher propagation speed can have a shorter lay length while maintaining the same propagation delay as a comparative twisted wire pair that has not had its propagation speed increased.

Greater differences in lay lengths while maintaining the same delay skew can allow the twisted pair data communication cables described herein to exhibit improved electrical performance. For example, by increasing the difference in lay lengths between each of the twisted wire pairs in a twisted pair data communication cable, the cable can minimize crosstalk between adjacent twisted wire pairs and can meet higher qualification standards without requiring the use of, for example, additional cable shielding around each of the twisted wire pairs. As can be appreciated, however, twisted pair data communication cables including such shielding is contemplated herein for additional performance in certain embodiments. Generally, the propagation speed of twisted wire pairs can be influenced by modifying the insulation material surrounding the conductive material of each wire in a twisted wire pair. The propagation speed can be calculated using the equation: $VOP=100/(DC)^{0.5}$ where VOP is the velocity of propagation (e.g., propagation speed) and DC is the dielectric constant. To decrease the propagation speed of a twisted wire pair, a material having a dielectric constant greater than the dielectric material of the insulation can be added to the insulation of each of the wires in the twisted wire pair. Conversely, to increase the propagation speed of a twisted wire pair, a material having a dielectric constant lower than the dielectric material of the insulation can be added to the insulation. Collectively, such materials are referred to herein as propagation speed modifiers.

Alternatively, the insulation material can be foamed to incorporate air (having a dielectric constant of about 1.00059) and to increase the propagation speed. In certain embodiments, the twisted pair data communication cables can incorporate propagation speed modifiers only to decrease the propagation speed. In certain embodiments, propagation speed modifiers can be used to lower the propagation speed of certain twisted wire pairs and propagation speed modifiers can be used to increase the propagation speed of other certain twisted wire pairs. In certain embodiments, the twisted pair data communication cables can decrease the propagation speed of one or more twisted wire pairs using a propagation speed modifier and can foam the insulation of one or more other twisted wire pairs to increase the propagation speed of the other twisted wire pairs.

In certain embodiments, a twisted wire pair communication cable can additionally modify a cable separator to adjust the propagation speed. In such embodiments, an asymmetric cable separator can be used to increase the path length of certain twisted wire pairs. For example, the twisted wire pair with the longest lay (e.g., having the fastest propagation speed) can be distally located farther away from the center of the twisted wire pair communication cable. Such distal adjustment can result in a greater pitch circle diameter and can increase the effective transmission length of the twisted wire pair. As a result, the fastest twisted wire pair can have a slower effective propagation speed. As can be appreciated, an asymmetric cable separator can be asymmetric for any number of twisted wire pairs. For example, each twisted wire pair can be distally located a different distance from the center of a twisted wire pair communication cable or only a single twisted wire pair can be located at a different distal distance. In certain embodiments, a twisted wire pair communication cable can modify the delay skew and propagation speed using only an asymmetric cable separator.

As can be appreciated, inclusion of a propagation speed modifier can be particularly advantageously because the propagation speed modifier can be used with any type of insulation. For example, propagation speed modifiers can be used with fluorinated insulation materials, such as fluorinated ethylene propylene, which demonstrate superior fire resistance compared to, for example, polyolefin materials. In certain embodiments, use of a propagation speed modifier can allow for a twisted pair data communication cable to pass the Underwriter's Laboratory ("UL") 910 (1998) Plenum Steiner Tunnel burn test while demonstrating performance similar to a twisted wire data communication cable formed with polyolefin.

As can be appreciated, known twisted pair data communication cables typically modify the delay skew by foaming the insulation of the wires in the shortest lay (e.g., having the slowest propagation speed) to increase the propagation speed. However, fire resistant insulation materials, such as fluorinated ethylene propylene, suffer from poor foaming ability and are easily crushed. The twisted pair data communication cables described herein overcome such issues by negating the need to foam fluorinated insulation material through the inclusion of a propagation speed modifier.

Suitable propagation speed modifiers are not generally limited and can include any material having both compatibility with the insulation material and a suitable dielectric constant. In certain embodiments, titanium dioxide can advantageously be selected as a propagation speed modifier to slow propagation speed. As can be appreciated, titanium dioxide is compatible with most insulation materials, has a high dielectric constant (about 86 to about 173 depending on form), and additionally is a common component already used in the manufacture of twisted wire pair insulation. When used as a propagation speed modifier, titanium dioxide can be used in a relatively higher loading level when compared to the use of titanium dioxide as a white colorant. In certain embodiments including titanium dioxide as a propagation speed modifier, an insulation layer can include titanium dioxide through inclusion of about 2% to about 20%, by weight of a titanium dioxide masterbatch having 10% to 30% titanium dioxide, or any integer range between about 2% to about 20%, by weight, such as about 3% to about 15%, about 4% to about 8%, etc. In certain embodiments, the insulation layer can include titanium dioxide at about 0.2% to about 1.5%, by weight, or at any range between about 0.2% to about 1.5% including about 0.3% to about 0.45%, etc.

In certain embodiments, additional examples of suitable propagation speed modifiers which can slow down propagation speed can include titanates such as strontium titanate, barium strontium titanate, barium titanate, and calcium copper titanate as well as zinc sulfide. As can be appreciated, such propagation speed modifier can have a dielectric constant greater than the dielectric constant of the materials used to form the insulation such as fluorinated ethylene propylene.

Propagation speed modifiers which slow down propagation speed can have an additional effect which further decreases propagation speed. As can be appreciated, the impedance of a wire is determined by the equation: $IMP=276/DC^{0.5} \times Log(D/r)$ where IMP is the impedance, DC is the dielectric constant, D is the diameter of the insulated wire, and r is the radius of the conductor. As such, inclusion of a propagation speed modifier with a higher dielectric constant, such as a propagation speed modifier which slows down propagation speed, can decrease the impedance of the twisted wire pair including such a propagation speed modifier. As can be appreciated, twisted pair data communication cables are designed to have an impedance of $100\pm5\Omega$. To bring the cable back to the designed impedance of $100\Omega$, the insulation thickness of the modified twisted wire pair can be increased. Increasing the thickness of the modified twisted wire pair can increase the helical path length of the twisted wire pair which can further increase propagation delay.

Where the insulation material surrounding the conductive material of each wire in one or more of the twisted wire pairs is partially or entirely foamed, foaming can be accomplishing through known techniques such as the incorporation of a blowing agent or the use of reactive components. Generally, the insulation material can be foamed to any suitable foam rate including foam rates of about 1% to about 90% as well as any foam rates between about 1% to about 90% including about 1% to about 50%, about 5% to about 30%, and about 6% to about 15%. As can be appreciated, foam rates for different insulation materials can vary. For example, suitable foam rates for FEP can be about 30% or less. In certain embodiments however, the twisted pair data communication cables described herein can be free of any foaming.

As can be appreciated, the present disclosure can improve the performance of a twisted pair data communication cable while only requiring the modification of one pair of twisted wire pairs. However, modification of two or more twisted wire pairs can further improve the performance of a cable. As can be further appreciated, modification of the propagation speed of a twisted wire pair can facilitate further improvements by allowing for the delay skew to be modified with a high degree of precision by varying the amount of propagation speed modifier included. Improvements in data skew can allow the twisted wire pairs in a cable to exhibit a greater difference in lay length.

As can be appreciated, the remaining components of a twisted pair data communication cable as described herein can be similar in design to Category 5, Category 5e, Category 6, Category 6A, and Category 7 cables standardized by ISO/IEC 11801.

For example, each of the insulated wires in the twisted wire pair can include a conductive wire and an insulation layer. The conductive wire can be solid or stranded and can be formed of any suitable conductive metal including one or more of copper, aluminum, steel, and silver. In certain embodiments, the conductive wire can advantageously be formed of copper due to copper's high electrical conductivity relative to volume.

As can be appreciated, stranded wire can be advantageous in certain embodiments due to the mechanical and electrical advantages exhibited by stranded wire. For example, stranded wires can exhibit increased flexibility and conductivity compared to a solid wire of identical gauge. In certain embodiments, the conductive wire can be a stranded copper wire.

Generally, the insulated wires can be of any suitable wire gauge. For example, in certain embodiments, the insulated wires can be sized in accordance to American Wire Gauge ("AWG") standards and each wire can have a size between 18 AWG and 32 AWG. For example, suitable insulated wires can be 26 AWG insulated wires 24 AWG insulated wires in certain embodiments. As can be appreciated, selection of the wire gauge can vary depending on factors such as the desired cable operating distance, the desired electrical performance, and physical parameters such as the thickness of the cable.

The insulated wires can be coated with any suitable insulating material which can provide the desired electrical properties. For example, suitable insulation layers can be formed of dielectric materials such as polyolefins (e.g., polypropylene, polyethylene, etc.) or fluoropolymers (e.g., fluorinated ethylene propylene ("FEP"), ethylene chlorotrifluoroethylene ("ECTFE"), perfluoromethyl alkoxy ("MFA" and "PFA"), polyvinylidene fluoride ("PVDF"), etc.). In certain embodiments, selection of a fluoropolymer can be advantageous due to the superior electrical properties (e.g., dielectric properties, and dissipation factors) and fire resistance properties exhibited by such materials when compared to polyolefins. In certain embodiments, twisted pair data communication cables described herein can use fluorinated materials for the insulated wires and can pass the UL 910 Plenum Steiner Tunnel burn test. In certain embodiments, the insulation layer can be formed of an FEP polymer. As can be appreciated, different insulation materials can be used for different twisted wire pairs in certain embodiments. Use of different insulation materials can be advantageous for cost or to further tune the dielectric properties of the twisted wire pairs.

As can be appreciated, selection of the insulation material can require the balancing of multiple properties. For example, FEP polymers which demonstrate desirable electrical performance typically exhibit a lower dielectric constant than FEP polymers with less desirable electrical properties. Inclusion of a propagation speed modifier can allow for a single insulation material to be used for all twisted wire pairs while still allowing the dielectric performance to be adjusted.

The thickness of the insulation can vary depending on the desired electrical performance. For example, each insulated wire of a twisted wire pair can have an insulation thickness of about 0.05 mm to about 0.40 mm in certain embodiments, about 0.10 mm to about 0.30 mm in certain embodiments, or about 0.17 mm to about 0.25 mm in certain embodiments. As can be appreciated, the thickness of the insulation can also vary depending on the wire gauge of the conductive wire. For example, 24 AWG insulated wires can include an insulation layer having a thickness of about 0.25 mm while 26 AWG insulated wires can include an insulation layer having a thickness of about 0.17 mm. The insulation resistance can be about 1,000 mΩ/km or greater.

As can be appreciated, the insulation can include additives, other than a propagation speed modifier, such as processing aids or colorants in certain embodiments. For example, it is customary to include blue, green, brown, and orange colorants to aid in the termination of twisted wire pair data communication cables.

The insulated wires can be twisted together in pairs to form a twisted wire pair which in turn can be twisted to form a cable core as known in the art. In certain embodiments, a cable separator, such as a cross-web can be included to further provide separation between each of the twisted wire pairs. In certain embodiments, the cable separator can be foamed to improve fire resistance and electrical performance. Cable shields can optionally be included around each twisted wire pair and can additionally, or alternatively, be included around the cable core in various embodiments. A cable jacket can surround the remaining components of the cable.

Examples

Inventive Example 1 is a data communication cable having four twisted wire pairs. One of the four twisted wire pairs was prepared with a higher loading level of titanium dioxide. Specifically, the orange twisted wire pair included 8%, by weight, of a titanium dioxide masterbatch having 10% to 30% titanium dioxide. The orange twisted wire pair had the longest lay length. The ratio between the longest and shortest lay lengths of the twisted wire pairs on a completed jacketed cable was 1.65. Each twisted wire pair had insulation formed of fluorinated ethylene propylene ("FEP") having a dielectric constant of 2.03-2.04 and a UL 94 flammability classification of V-0. Inventive Example 1 further included a 155 mil crossweb and a shield formed of 2 mil thick aluminum laminated with 0.5 mil polyethylene terephthalate on both sides. The conductors were 23 American Wire Gauge ("AWG") solid copper.

The inclusion of high loading levels of titanium dioxide in the orange twisted wire pair resulted in a 2 to 8 nanosecond skew rate improvement when compared to a similar comparative data cable formed with 1% of the titanium dioxide masterbatch. The improved skew is believed to have been caused by a slower propagation speed of the orange twisted wire pair in Inventive Example 1. The observed improvement in skew rate means the propagation delay (e.g., the time required to propagate a signal 100 meters) of the orange twisted wire pair (having the longest lay length) of Inventive Example 1 was 2 to 8 nanoseconds slower than the propagation delay of the similar twisted wire pair in the comparative data cable. As can be appreciated, improvements to the skew rate, by increasing the lay length difference between the longest lay length twisted wire pair and the other twisted wire pairs as described herein, can be used to improve the electrical performance of a cable.

Inventive Example 2 evaluated the electrical properties of a copper conductor coated, by weight, with 96% FEP and 4% titanium dioxide masterbatch. The FEP had a dielectric constant of 2.03-2.04 and a UL 94 flammability classification of V-0. The titanium dioxide masterbatch included 10% to 30% titanium dioxide.

The insulation layer of Inventive Example 2 was determined to have an increased dielectric constant of 2.07 at a frequency of 1 MHz, compared to an unmodified dielectric constant of 2.03 to 2.04, when calculated from observed capacitance measurements. The insulation layer of Inventive Example 2 was determined to have a concentration of 0.3% to 0.45% titanium dioxide.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A communication cable comprising:
    a cable core comprising:
        a first twisted wire pair having a first lay length and comprising two insulated wires; and
        a second twisted wire pair having a second lay length, the second lay length being shorter than the first lay length;
        wherein the two insulated wires of the first twisted wire pair each comprise a insulation layer formed of a fluoropolymer and a propagation speed modifier;
        wherein the propagation speed modifier comprises titanium dioxide; and
        wherein the insulation layer of each of the two insulated wires of the first twisted wire pair comprise about 0.2% to about 0.45%, by weight, of the propagation speed modifier; and
    a jacket layer surrounding the cable core;
    wherein the communication cable exhibits a delay skew of about 45 nanoseconds or less over a cable length of 100 meters.

2. The communication cable of claim 1, wherein the ratio in lay length between the first lay length and the second lay length is about 1.64 or greater.

3. The communication cable of claim 1, wherein the fluoropolymer comprises fluorinated ethylene propylene.

4. The communication cable of claim 1, wherein the insulation layer of each of the two insulated wires of the first twisted wire pair comprise about 0.3% to about 0.45%, by weight, of the propagation speed modifier.

5. The communication cable of claim 1, wherein the first twisted wire pair comprises an impedance of about 100 ohms.

6. The communication cable of claim 1, wherein the insulation layer of each of the two insulated wires of the first twisted wire pair have a dielectric constant of about 2.07 or greater at 1 MHz.

7. The communication cable of claim 1, wherein the first twisted wire pair exhibits a propagation delay about 2 nanoseconds to about 8 nanoseconds slower than the propagation delay of a comparable twisted wire pair formed without the propagation speed modifier.

8. The communication cable of claim 1, wherein the second twisted wire pair comprises two insulated wires; and
    wherein the insulation layer of each of the two insulated wires of the first twisted wire pair have a greater thickness than the insulation layer of each of the two insulated wires of the second twisted wire pair.

9. The communication cable of claim 1, wherein the cable core comprises a plurality of twisted wire pairs and wherein two or more of the twisted wire pairs comprise insulated wires comprising the propagation speed modifier.

10. The communication cable of claim 1, wherein the cable core comprises a plurality of twisted wire pairs and wherein one or more of the plurality of twisted wire pairs comprise insulated wires comprising a foamed insulation layer.

11. The communication cable according to claim 10, wherein the foamed insulation layers are free of the propagation speed modifier.

12. The communication cable of claim 1, wherein the cable core comprises a plurality of twisted wire pairs, each comprising two insulated wires; and wherein the insulation layer of each of the insulated wires comprises fluorinated ethylene propylene.

13. The communication cable of claim 1, wherein the cable core further comprises a cable separator.

14. The communication cable of claim 13, wherein the cable separator comprises a crossweb separator.

15. The communication cable of claim 13, wherein the cable separator is an asymmetric cable separator, the asymmetric cable separator distally displacing the first twisted wire pair outward from the center of the cable core.

16. The communication cable of claim 1, further comprising a cable shield surrounding the cable core.

17. The communication cable of claim 1 passes the requirements of the Underwriter's Laboratory ("UL") 910 (1998) Plenum Steiner Tunnel burn test.

18. The communication cable of claim 1 meets the requirements of a Category 5, Category 5e, Category 6, Category 6A, or Category 7 cable as defined by International Standards Organization ("ISO") and International Electrotechnical Commission ("IEC") 11801 (2017).

19. A communication cable comprising:
a cable core comprising:
    a first twisted wire pair having a first lay length and comprising two insulated wires, each insulated wire comprising an insulation layer formed of a fluoropolymer and about 0.2% to about 0.45%, by weight, of a propagation speed modifier comprising titanium dioxide; and
    a second twisted wire pair having a second lay length and comprising two insulated wires, each insulated wire comprising a foamed insulation layer; and
    wherein the first lay length is the longest lay length in the communication cable and the second lay length is the shortest lay length in the communication cable; and
a jacket layer surrounding the cable core;
wherein the communication cable exhibits a delay skew of about 45 nanoseconds or less over a cable length of 100 meters.

* * * * *